United States Patent

[11] 3,603,156

[72] Inventor Timothy Konkol
 Westchester, N.Y.
[21] Appl. No. 8,604
[22] Filed Feb. 4, 1970
[45] Patented Sept. 7, 1971
[73] Assignee Gradko Glass Laboratories, Inc.
 Yonkers, N.Y.

[54] DISPOSABLE DILUTION SYSTEM
 15 Claims, 15 Drawing Figs.
[52] U.S. Cl. .................................................... 73/425.4,
 23/259, 23/292
[51] Int. Cl. ...................................................... G01n 1/10
[50] Field of Search .......................................... 73/425.4 R,
 425.4 P, 425.6; 222/158; 128/216; 206/62.3

[56] References Cited
 UNITED STATES PATENTS
2,693,183 11/1954 Lockhart...................... 73/425.6

2,965,255 12/1960 Gerard.......................... 73/425.6
3,045,494 7/1962 Gerard.......................... 73/425.6

Primary Examiner—S. Clement Swisher
Attorney—Eliot S. Gerber

ABSTRACT: A disposable dilution system that includes a container having a predetermined volume of diluent and a capillary tube in a holder. At its outer end, the capillary tube takes up a specific volume of sample that is related to the volume of diluent. The tube holder has a window or inspection port through which the inner end of the tube may be viewed. The entire tube in its holder is then placed in the container at its outer end. A bore in the holder, at its outer end, is sealed and the container shaken. The diluted solution may then be squeezed from the inverted container through the bore in the holder.

INVENTOR
TIMOTHY KONKOL

BY Eliot S. Gerber
ATTORNEY

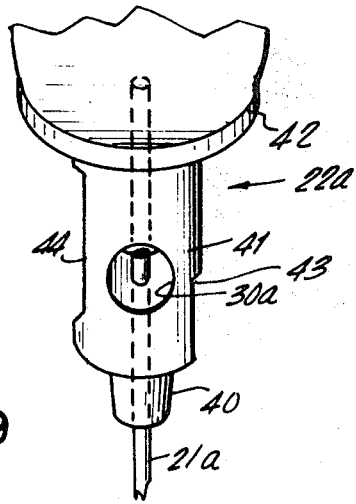
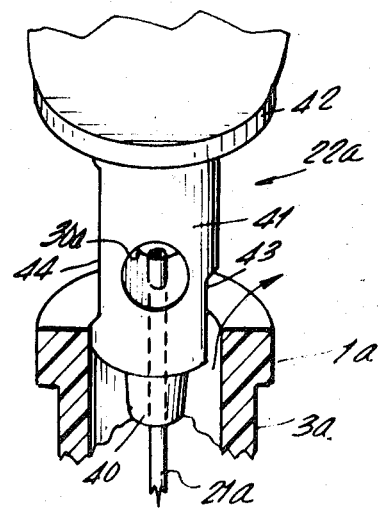
FIG. 9
FIG. 10
FIG. 11
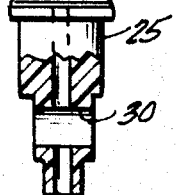
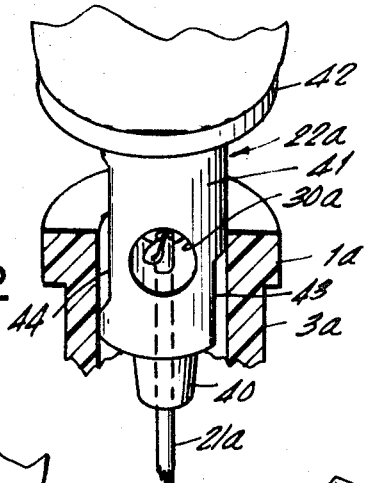
FIG. 12
FIG. 13
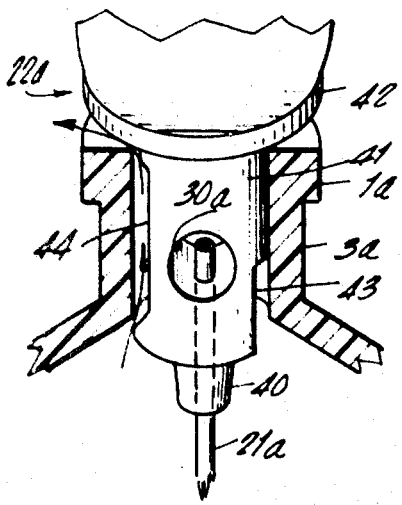
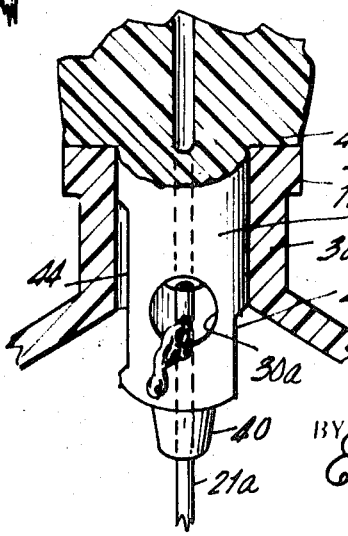
FIG. 14
FIG. 15

3,603,156

1

DISPOSABLE DILUTION SYSTEM

DISCLOSURE

The present invention relates to testing apparatus and more particularly to an accurate, disposable dilution system for clinical and industrial use.

At the present time many liquids are diluted by using pipettes, which are calibrated tubes. For example, to obtain a blood cell count a nurse will obtain a blood sample by venipuncture and place it in a vial that contains an anticoagulant. At the laboratory a technician will open the vial, place the open end of a pipette into the blood, draw blood up to a pipette graduation by suction, close the end to which the suction was applied, then lower the pipette into the container of diluent. Suction is again applied until the total volume of fluid in the pipette reaches a second calibration. The pipette is then shaken to effect solution. This is a slow and tedious way to obtain a specific dilution, the accuracy of the dilution depending upon the skill of the technician. With the need for more testing, the rising wages and uncertain skill of technical aides, there is a need for a fast, accurate and disposable system for performing routine dilutions.

One proposal to meet that need uses a capillary tube having a predetermined volume which is used along with a plastic reservoir containing a measured volume of diluent. That system, however, requires skill by the technician as the head of the capillary tube is buried in the handle and cannot be seen. In addition, that system requires many manipulative steps.

It is the objective of the present invention to provide a disposable single-use dilution system, which (i) is accurate relative to existing dilution methods, (ii) may be utilized by relatively inexperienced personnel, (iii) requires a minimal number of manipulative steps, and (iv) is relatively inexpensive.

In accordance with the present invention, the dilution system is intended to be disposable after a single use. For example, in counting either red or white blood cells, a nurse punctures the skin of the patient to obtain a drop of blood. She places the end of a capillary tube within the drop of blood, and a sample of specific volume is drawn into the tube by capillary action. The capillary tube is secured within a holder, which has a hole at the opposite end of the capillary tube for detection of sampling completion. Then the nurse removes the cover from the neck of a container having a premeasured volume of diluent. The holder is arranged so that the entire capillary tube is placed within the container and the holder seals the container. The holder has attached to it, or associated with it, a small cap which closes its bore. The system is closed by the cap, and the nurse will then shake the container, shaking out the blood into the diluent. The diluent will pass through the capillary tube, washing the last traces of blood from the tube and providing an exact ratio between the volume of blood held within the capillary tube and the total volume of solution. The nurse will then squeeze the compressible container, forcing the diluted blood out of a bore of the holder. After removal of as much of the solution as is desired from the container, the container and holder are disposed of.

In order for the system to be disposable, it is necessary that it be of low cost, for example, preferably less than 20 cents for the entire unit. Such a low-cost disposable unit has advantages compared with the use of a pipette, which is used over and over again. One of these advantages is that no equipment, reagents, or personnel are required for cleaning used pipettes. Another advantage is that errors due to improper cleaning or incomplete drying are eliminated. A third advantage is that the capillary tube provides an exact volume of liquid, as does the predetermined quantity of diluent. Consequently, the technician need not be highly skilled in the reading of marks or other measuring indicia. In addition, segregation of diluent increments avoid contamination that is possible when successive increments are measured from the same batch of diluent.

2

Other objectives of the present invention will be apparent from the following detailed description, taken in conjunction with the accompanying drawing, which gives the inventor's best mode of practicing the invention. In the drawings:

FIG. 9 is a side plan view of the holder body without its capillary tube;

FIG. 10 is a perspective view of an alternative embodiment of the holder; and

FIGS. 11–15 are perspective views of the holder of FIG. 10 in its sequential stages of insertion into the container.

Figure 1:
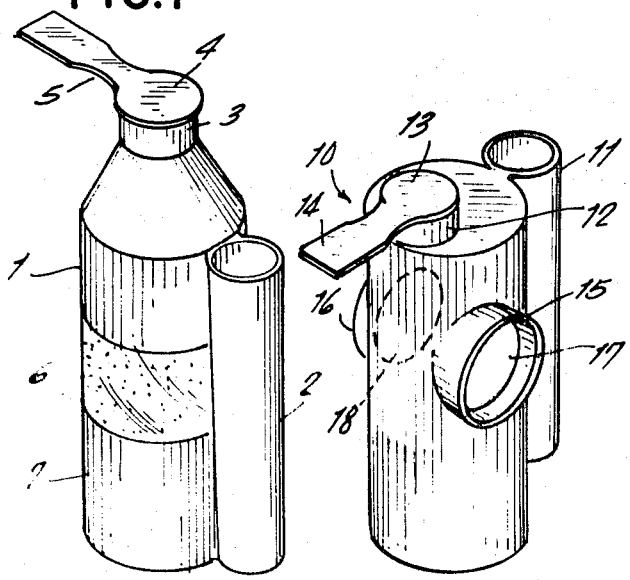
FIG. 1 is a perspective view of the diluent container of the first embodiment of the invention.

As shown in FIG. 1, the container portion of the first embodiment constitutes a squeezable plastic reservoir container, for example, of a suitable plastic resin such as polyethylene. The plastic container 1 is in the form of a cylindrical bottle, although other shapes may be utilized. The material from which the container is formed is flexible and resilient, permitting the container to be compressed (squeezed) by the user's finger and its internal volume reduced. In the drawings, the container is shown as being molded from a clear or slightly milky plastic resin. The container has at its side, and integral with it, a scabbard 2 in the form of a tube having a bottom closed end and a top open end.

The top of the container forms a neck portion 3 which is closed by a cover 4, the cover 4 being removably adhered to the top of the neck portion 3. The cover 4 has a tab (holding) portion 5 integrally formed therewith. A band 6 of color material is printed or otherwise formed either on the external or internal wall surface of the container 1. The reservoir contains a premeasured amount of diluent liquid. The band provides a color code which informs the user of the composition of the diluent liquid in the reservoir. The type of diluent liquid used depends upon the use to which the container will be put. For example, if the container is used to dilute a blood sample for white blood cell counting, the diluent liquid would constitute an aqueous acetic acid solution. If the container is used to dilute blood for a red blood cell count, the diluent would constitute a sodium chloride solution.

Figure 2:
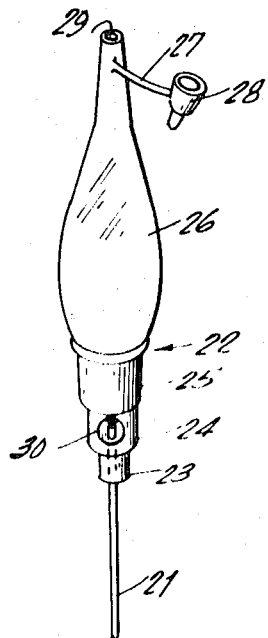
FIG. 2 is a perspective view of the container of the second embodiment of the present invention.

The container of FIG. 2 is similar, in some respects, to that of FIG. 1. The container 10 also comprises a cylindrical bottle of squeezable plastic resin. The container 10 has integral therewith a scabbard 11 which is in the form of a tube having a closed bottom end and an open top. The container 10 has an integral neck portion 12 which is offset from the axis of symmetry of container 10, away from scabbard 11, and is covered by cover 13 which is removable adhered to the neck portion. The cover 13 has an integral tab portion 14. The sidewalls of container 10, which are, respectively, the front and rear of the container 10, are in the form of cylinders 15 and 16, with a mutual axis that protrudes outward. At the inner ends of cylinders 15 and 16 are circular membranes 17 and 18 that are flexible, parallel and optically transparent.

Figure 3:
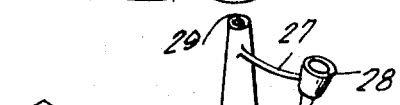
FIG. 3 is composed of front and side views of the capillary tube holder which is utilized with either of the reservoirs of FIGS. 1 or 2.

The capillary tube holder is shown in FIG. 3. The capillary tube 21 is preferably of glass and is a tubular capillary having a certain predetermined internal diameter and length. The glass tube 21 is secured partly within the holder 22 formed of a suitable plastic resin material, for example, polyethylene. The plastic holder 22 includes a bottom neck portion 23 having a bore within which the pipette fits and is securely held, an intermediate neck portion 24 also having a bore 29, and a strap 27 having attached to it a closure cap 28 having a cavity which fits over the top of the bore 29. The intermediate neck portion 24 has an inspection port (window hole) 30. The inner end of the capillary tube protrudes into the port 30. The plastic holder 22 grips the smaller capillary tube firmly and prevents its separation during transit and use.

The versatility of the system of the present invention that can be achieved through adjustment of volume parameters (micropipette volume and diluent volume) makes the system applicable to the almost infinite number of clinical and industrial tests that require higher dilutions. Almost any sample dilution can be performed provided the sample is a liquid of average to low viscosity and the volume of total solution required does not exceed 20 ml. (instrumental methods of analysis typically would use a maximum of 5 ml.).

The following is a list of clinical and industrial tests to which the system is applicable. The list is not complete, but exemplifies the versatility of this invention.

In clinical hematology, the system may be used for dilutions required in red blood cell counts, white blood cell counts, platlette counts, hemoglobin determinations, eosinophil counts, red blood cell fragility determinations, total biliruben determinations, calcium and magnesium determinations, and sodium and potassium determinations. Other clinical applications are corpuscular counts on cloudy cerebrospinal fluid, and sperm counts.

The industrial uses include: bromine in water, chloride/chlorine in water (orthotolidine method), chlorine demand test, dissolved iron in water, flame lithium, ultraviolet nitrate in water, M & P alkalinityk floride (Spadns Reagent), and turbidimetric sulfate.

Figure 4:
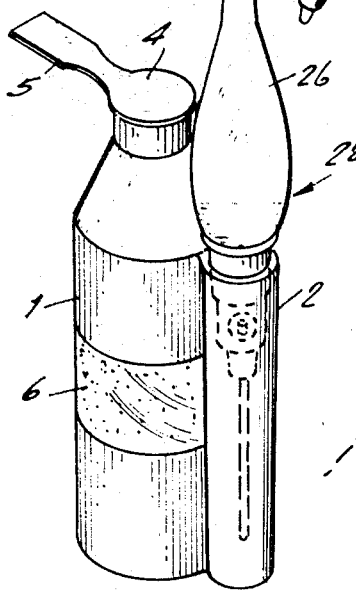
FIG. 4 is a perspective view of the capillary tube holder in its scabbard.
Figure 5:
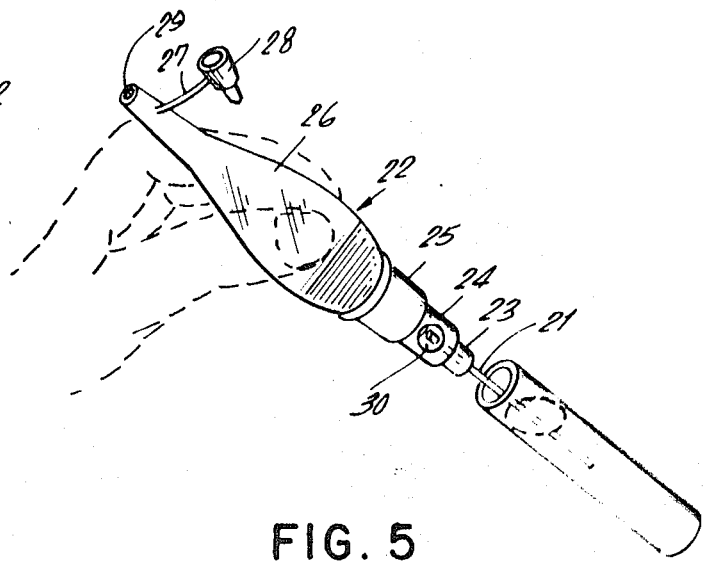
FIG. 5 is a perspective view of the capillary tube holder being utilized to obtain a sample.

In operation, the technician removes the dilution system consisting of the container 1 and the holder 22 from its box or bag, see FIG. 4. He then removes the holder 22 from its scabbard 2. The tube 21 is protected from breakage and contamination by dirt by scabbard 2, and flat handle portion 26 orients holder 22 in such a position that inspection port 30 is visible, permitting him to view the inner end of capillary 21, see FIG. 5. The technician then brings the free end of the capillary tube 21 to within the liquid to be diluted and the liquid will consequently rise within the capillary tube 21. The capacity of suitable tubes may vary from 5 to 100 microliters depending on sample size and viscosity. The technician will hold the holder 22 inclined towards the horizontal, even without experience, as he will desire to see into the window hole 30. This aids in filling the capillary tube.

The technician will watch until the liquid rises to the upper end of the capillary tube 21, by regarding the end of the capillary tube 21 which protrudes within the window hole 30. When he sees that the capillary tube is full of the sample liquid, he will then proceed with the steps of dilution.

Figure 6:
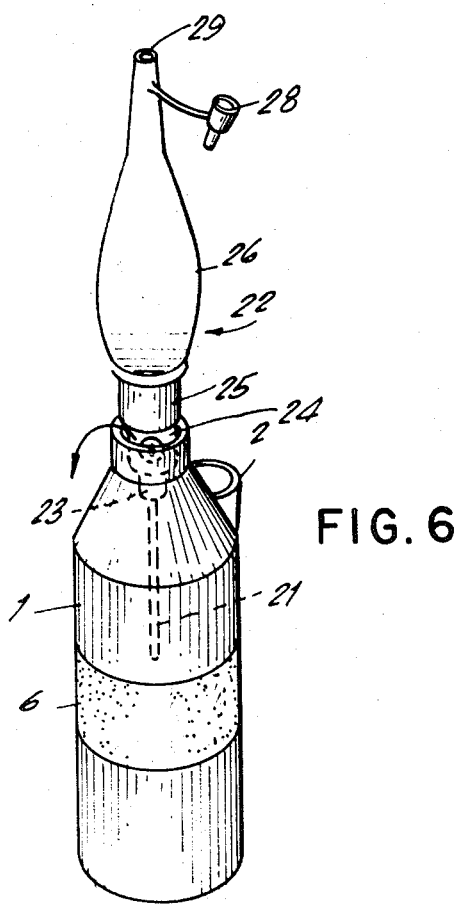
FIGS. 6 and 7 are perspective views showing the capillary tube holder being inserted into the reservoir.
Figure 7:
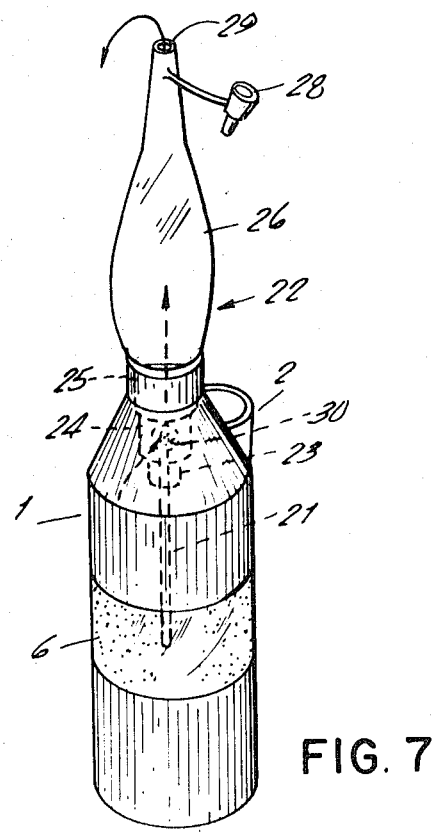
Figure 8:
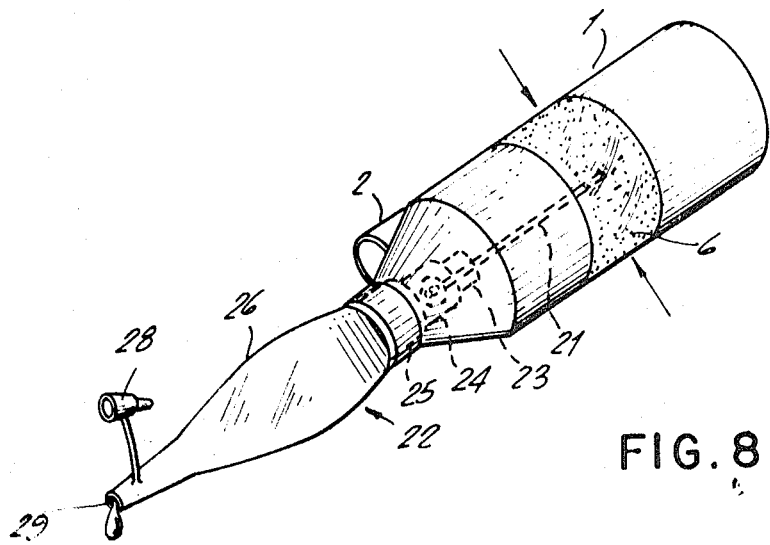
FIG. 8 is a perspective view showing the dispension of the diluted sample from the assembly of the container and capillary tube holder.

For the purpose of diluting the liquid within the capillary tube 21, the technician will first pull off the cover of the container by pulling on the tab 5. He will then insert the capillary tube 21 into the container 1 by bringing the neck portion 3 of the container 1, as shown in FIG. 6, permitting the air of the container to be vented. Further pressure downward on the holder 22 causes the top neck portion 25 to be seated and seals the neck portion 3 of the container 1, the entire capillary tube 21 being within the container 1, see FIG. 7. At that time the window port 30 will likewise be within the container 1 below the seal. Any pressure is vented through port 30 and bore 29 without loss of liquid. The technician will place the cap 28 over the end of the holder 22. The technician will then shake the container, causing the liquid to come out of the capillary tube and to be replaced by the diluting liquid which will wash through any remaining undiluted sample within the capillary tube. The technician will then remove the cap 28 from the end of holder 22 and insert the assembly and squeeze the plastic container 1, as shown in FIG. 8. Such squeezing reduces the internal volume of the plastic container 1 and forces the diluted sample out through port 30 and bore 29 and onto a hemocytometer or other testing instrument in which the diluted liquid is to be used.

If the container 10 with optical windows 15 and 16 is used, the technician will follow the same procedure to obtain a diluted solution. The technician will then place the container 10 within a spectrometer equipped with telescoping cell mounts. The cell mounts are two cylindrical telescoping tubes that approach the container from opposite sides. In essence, one tube conducts monochromatic light to container 10 and the other tube conducts the monochromatic light that has passed through the diluted sample, away from container 10 to a detecting device such as a photocell. Container neck 12 is offset so that, when inserted, the capillary tube is not in the path of the beam of light.

When the technician is ready to measure the percent transmission of the solution in container 10, he telescopes the cell mounts toward the cylinders 15 and 16. The axis of the telescoping mounts and cylinders 15 and 16 is mutual. Scabbard 11 acts as a key to place container 10 in the proper orientation. As the cell mounts enter cylinders 15 and 16, a seal is formed that blocks any light from outside the container and cell mounts will continue to merge, compressing membranes 17 and 18 inward. The telescoping mounts will stop a predetermined distance apart. At this point, container 10 is a cuvette with a predetermined distance between the inner walls and with walls that are optically transparent, walls that do not absorb any of the incident radiation.

An alternative embodiment of the present invention is shown in connection with FIGS. 10-15. That embodiment is the same as the previously described embodiment in all respects, except for the shape of the neck portion of the plastic holder. The neck portion of the plastic holder in the embodiment of FIGS. 10-15 provides for a series of sequential partial seals against the internal wall of the neck of the container. As shown in FIG. 10, the neck portion of the holder consists of a small bottom portion 40 holding the glass capillary tube 21a, and an enlarged upper neck portion 41 having an inspection port (window hole 30a). The upper neck portion terminates in an enlarged cap 42. A slot 43 is created by cutting away from the circumference of the neck at the bottom and one side, and the second slot 44 is created by cutting away from the neck at the top on the opposite side.

In operation, as shown in FIG. 11, the neck portion of holder 22a has begun to be inserted through the neck portion 3a of the container 1a. A complete seal is not attained as there is a vent opening through the lower slot 43. The lower slot 43 vents any pressure which might be created by the insertion of the holder 22a into the container 1a, when the upper end of the lower slot 43 is within the neck, causes a slight buildup of pressure in the container, resulting in a pumping of the diluent through the capillary tube and into the inspection port 30a.

As shown in FIG. 13, the continued insertion of the holder 22a results in the inspection port becoming almost full of the slightly diluted sample. The upper slot 44, at this time, permits a slight opening to the atmosphere. As shown in FIG. 14, the inspection port 30a is still bounded by the internal wall of the container 1a at its neck portion 3a so that the liquid within the port 30a cannot escape. A vent is created through the slot 44 which permits the pressure built up within the container 10 to escape. AS shown in FIG. 15, the cap 42 has come to rest on the top of the neck 3a, sealing the holder. The liquid in the port 30a flows out within the container. As in the previous embodiment, the stopper is placed in the holder's bore, the container is shaken until dilution is obtained, the stopper is removed from the bore within the holder, the container is squeezed and the diluted liquid is ejected.

The diluent container of the present invention has been specially designed. Its scabbard is a protective and tight sealing receptacle for the holder and its capillary tube, thus forming a one-test unit. The large neck opening provides for easy insertion of the capillary tube and the container is color coded for diluent identification. Another embodiment of the diluent container is equipped with optically transparent windows with cylindrical housings, an offset neck, and a scabbard may serve as a disposable cuvette for spectrophotometric measurements when used with telescoping cell mounts. The scabbard serves as a key to orient the container in the proper position for approach of the cell mounts. The cylindrical window housings and cell mounts provide a seal that eliminates any extraneous light and the transparent flexible windows are compressed to a predetermined distance by the cell mounts. The capillary tube, which is positioned in the container, does not interfere with the beam of light transmitted and received by the cell mounts because the neck of the container is offset.

The structure of the capillary holder has certain advantages. Its flat sides, at its top, positions the holder in the user's hand so that the inspection port is visible. The top neck portion of the holder is tapered for easy insertion into the diluent container and its size is matched to the dimensions of the neck to provide a leakproof seal. The neck portion, having the inspection port, is smaller than the internal neck diameter of the container to prevent a premature seal with its accompanying increase in pressure in the container, which could force the undiluted sample through the inspection port. The cap seals the bore and enables the diluted sample to be held during a reaction, transported or held in storage. Its thin bore permits a small amount of diluted sample to be accurately placed or the entire contents to be dispensed.

The inspection window hole is an important feature of the present invention. It permits the inner end of the capillary tube to be viewed by the user, which insures that the tube is full. Scrutiny of the inspection port unconsciously prompts the user to keep the capillary tube away from the vertical and toward the horizontal, which aids its capillary action. Since the capillary tube protrudes within the inspection port, the inner end of the tube is bounded by air, and, consequently, sample liquid at the top of the capillary tube is subjected to no surface tensions other than the tube itself. It is, therefore, impossible for this invention to accidentally collect a sample volume greater than the capillary tube volume. After the holder is inserted into the container, and before its bore is capped, the inspection port provides a post-sealing pressure vent for the container, because of its connection with the bore of the holder. The inspection port, which is below the sealing level of the holder in the container, permits the liquid in the tube to be flushed out by the diluent. Finally, the inspection port, due to its communication with the bore of the holder, permits the diluted liquid to be dispensed from the container.

I claim:

1. The combination of a container and a capillary tube assembly,
   the said container having a compressible flexible portion and having an opening, a measured amount of diluent within the container for the purpose of diluting the liquid within the capillary tube,
   the capillary tube assembly comprising a capillary tube of predetermined length and internal diameter and a capillary tube holder having means to grip the capillary tube,
   said tube holder having an inspection port within which an end of the capillary tube protrudes, a bore extending from the port to an outer end of the holder to permit the diluted liquid to be squeezed out from the container, and a neck portion which removably fits within the opening of the container and seals the container except for the opening through the bore of the holder, said inspection port and both ends of said capillary tube being within said container permitting them to be flushed by said diluent.

2. The combination of claim 1 wherein the means to grip the capillary tube forms a lower neck portion which is narrower than the neck and the said port is positioned between the lower neck portion and the said neck portion, whereby a premature seal is prevented in the process of detachably sealing said holder to said container.

3. The combination of claim 1 wherein parts of the wall of said container have two cylindrical collars with mutual axis that extend outward from said container and within each collar is formed a planar, flexible, optically transparent membrane.

4. The combination of claim 3 wherein the membrane areas are on opposite sides of said container permitting a beam of light to pass through both membranes.

5. The combination of claim 4 wherein the neck of said container is offcenter for the purpose of removing said capillary tube and holder, when detachably inserted, from said beam of light.

6. The combination of claim 3 wherein said membranes are flexible and can be positioned at a predetermined distance relative to each other by external sleeves that telescope into said collars.

7. The combination of claim 3 wherein said collars are adapted to detachably seal with external telescoping sleeves for the purpose of preventing entry of extraneous light.

8. The combination of claim 1 wherein said container has an integral scabbard holder adapted to removably retain the capillary tube holder and said capillary tube holder is positioned in said scabbard.

9. The combination of claim 8 wherein said scabbard is tubular and has a closed bottom and an open top.

10. The combination of claim 1 and also including a cap to seal the bore of the capillary tube holder, said cap sealing the bore at its outer open end away from the capillary tube.

11. The combination of claim 10 wherein said cap is connected to said capillary tube holder by a flexible band.

12. The combination of a container and a capillary tube assembly,
    the said container having a compressible flexible portion and having an opening, a measured amount of diluent within the container for the purpose of diluting the liquid within the capillary tube,
    the capillary tube assembly comprising a capillary tube of predetermined length and internal diameter, and a capillary tube holder having means to grip the capillary tube,
    said tube holder having an inspection port within which an end of the capillary tube protrudes, a bore extending from the port to an outer end of the holder to permit the diluted liquid to be squeezed out from the container, a neck portion which removably fits within the opening of the container and seals the container except for the opening through the bore of the holder, and a removable cap which seals said bore, said inspection port and both ends of said capillary tube being within the said container,
    whereby the inspection port permits viewing the end of the tube, permits the flow of diluent therethrough, prevents extraneous capillary action, vents the container pressure when sealing said holder to said container, and aids in orienting the holder to be inclined toward its horizontal position during viewing.

13. A dilution system as in claim 12 wherein a scabbard is connected to said container at one side thereof and said container has portions of its wall optically permitting light thereof, the said scabbard acting as a key to orient the container for instrumental analysis of its contents.

14. A dilution system as in claim 12 wherein the holder has an upper portion away from its gripping portion and said upper portion has flattened sides permitting it to be grasped by the fingers, orienting said inspection port and thereby dictating correct operation of said holder.

15. A dilution system as in claim 12 wherein the holder has a neck portion having an external diameter about equal to the internal diameter of the opening of the neck portion of the container and said neck portion has a top slot and a bottom slot, said slots providing sequential vents as the holder is inserted into the neck.